United States Patent [19]

Blount

[11] 3,929,972

[45] Dec. 30, 1975

[54] PRODUCTION OF SILICO-DIHYDROGEN SULFATE

[76] Inventor: David H. Blount, 5450 Lea St., San Diego, Calif. 92105

[22] Filed: Nov. 27, 1974

[21] Appl. No.: 527,906

Related U.S. Application Data

[63] Continuation-in-part of Ser. No. 287,898, Aug. 13, 1973.

[52] U.S. Cl. .................. 423/325; 423/520; 423/522
[51] Int. Cl.² .......................................... C01B 33/00
[58] Field of Search ........... 423/325, 520, 544, 339, 423/522

[56] References Cited

UNITED STATES PATENTS

| 3,235,331 | 2/1966 | Nauroth et al. | 423/339 |
| 3,445,189 | 5/1969 | Maat et al. | 423/325 |
| 3,480,390 | 11/1969 | Reinhardt et al. | 423/339 |

*Primary Examiner*—Edward Stern

[57] ABSTRACT

Silico-dihydrogen sulfate is produced by reacting and slowly adding a dry alkali metal silicate or an alkaline earth metal silicate to concentrated sulfuric acid in the ratio of 1:4 mols, and then subsequently adding 2 mols of concentrated sulfuric acid to complete the reaction.

6 Claims, No Drawings

PRODUCTION OF SILICO-DIHYDROGEN SULFATE

Continuation-in-part application of Ser. No. 287,898, filed Aug. 13, 1973 by applicant David H. Blount, M.D.

SUMMARY OF THE INVENTION

This invention relates to a process for the production of silico-dihydrogen sulfate by reacting dry alkali metal silicates or dry alkaline earth metal silicates with concentrated sulfuric acid. The dry alkali metal silicate or dry alkaline earth metal silicate used in this process should have less than 6 mols of water per mol of alkali metal silicate or dry alkaline earth silicate. When the amount of water is greater than 6 mols of water per mol of alkali metal silicate or alkaline earth metal silicate, silicic acid and silicon dioxide will be formed when the alkali metal or alkaline earth metal silicate is chemically reacted with concentrated sulfuric acid.

I have discovered that silico-dihydrogen sulfate [(SiO(HSO$_4$)$_2$] is formed when an alkali metal silicate or alkaline earth metal silicate is reacted with concentrated sulfuric acid, and when using an excess of sulfuric acid above the ratio of 1:4 mols. When only 1:4 ratio is used, the excess acid salt and water produced in the reaction prevents the formation of most of the silico-dihydrogen sulfate [SiO(HSO$_4$)], thus forming dihydroxy silicon dihydrogen sulfate. By adding sulfuric acid, the dihydroxy silicon dihydrogen sulfate is converted to silico-dihydrogen sulfate. Silico-dihydrogen sulfate may be produced in one step if 6 mols of concentrated sulfuric acid is used per mol of dry alkali metal silicate.

Chemical Reactions:

Na$_2$SiO$_3$·5H$_2$O + 4H$_2$SO$_4$ ----→(OH)$_2$Si(HSO$_4$)$_2$ + 2NaHSO$_4$ + 6H$_2$O    (1)

(OH)$_2$Si(HSO$_4$)$_2$ + 2H$_2$SO$_4$ ----→ SiO(HSO$_4$)$_2$ + 2H$_2$SO$_4$ + H$_2$O    (2)

Na$_2$SiO$_3$ + 6H$_2$SO$_4$---→SiO(HSO$_4$)$_2$ + 2NaHSO$_4$ + 2H$_2$SO$_4$ + 2H$_2$O    (3)

When silico-dihydrogen sulfate [SiO(HSO$_4$)$_2$] is mixed with water, it readily decomposes to silico-formic acid (H.SiO.OH) and sulfuric acid. Silico-dihydrogen sulfate is a white granular compound when produced by this process.

The primary object of the present invention is to produce slico-dihydrogen sulfate [SiO(HSO$_4$)$_2$]. A further object is to produce inorganic silico-dihydrogen sulfate, which will readily react with organic compounds to form useful silicoorganic compounds. A further object is to produce silico-dihydrogen sulfate which will readily react with inorganic compounds to form useful inorganic silicates. A further object is to produce silicodihydrogen sulfate that will readily decompose to silico-formic acid when water is mixed with the compound.

DESCRIPTION OF THE PREFERRED EMBODIMENTS

My invention will be illustrated in greater detail by the specific example which follows, it being understood that this is merely an illustration of, and not limited to, procedures which may be used in the production of silico-dihydrogen sulfate.

EXAMPLE I

Sodium metasilicate pentahydrate (Na$_2$SiO$_3$· 5H$_2$O) is gradually added over a period of 15–20 minutes to concentrated sulfuric acid in the ratio of 1:4 mols with agitation, keeping the temperature between 25°–100° C. The reaction is completed in 2–6 hours, producing a white granular mixture containing dihydroxy silicon dihydrogen sulfate, silico-dihydrogen sulfate, sodium hydrogen sulfate, and water. As much of the water and sodium hydrogen sulfate as possible is removed by filtration. An additional two mols of sulfuric acid per mol of sodium metasilicate is added to the dihydroxy silicon dihydrogen sulfate [(HO)$_2$Si(HSO$_4$)$_2$] and reacts with it to form silico-dihydrogen sulfate [SiO(HSO$_4$)$_2$]. The sulfuric acid, sodium hydrogen sulfate, and water are filtered off, thereby leaving a white granular compound, silico-dihydrogen sulfate [SiO(HSO$_4$)$_2$].

EXAMPLE II

Sodium metasilicate, containing less than 6 mols of water per mol of sodium metasilicate, is slowly added over a period of 15–20 minutes to concentrated sulfuric acid in the ratio of 1:6 mols, with agitation, to keep the temperature between 25°–100° C. The reaction is completed in 2–6 hours. To recover the silicodihydrogen sulfate [SiO(HSO$_4$)], the excess 2 mols of sulfuric acid, which has been diluted with water, and sodium hydrogen sulfate is filtered off, leaving a white granular compound, silico-dihydrogen sulfate [SiO(HSO$_4$)$_2$].

EXAMPLE III

Potassium metasilicate containing less than 6 mols of water per mol of potassium metasilicate is slowly added to concentrated sulfuric acid over a period of 15–20 minutes in the ratio of 1:4 mols, with agitation, to keep the temperature between 25°–100° C. The reaction is completed in 2–6 hours. The excess water and potassium hydrogen sulfate is filtered from the white granular mixture of dihydroxy silicon dihydrogen sulfate [(HO)$_2$Si(HSO$_4$)$_2$], silico-dihydrogen sulfate [SiO(HSO$_4$)$_2$], and potassium hydrogen sulfate.

Two additional mols of sulfuric acid are added to the said mixture, and the reaction is completed in 20–30 minutes. The sulfuric acid, which has been diluted with water and potassium hydrogen sulfate is filtered off of the white granular compound, silico-dihydrogen sulfate [SiO(HSO$_4$)$_2$]. The silico-dihydrogen sulfate may be washed with concentrated sulfuric acid to remove any remaining potassium hydrogen sulfate.

Various modifications can be made in the instant invention without departing from the spirit or scope thereof, for it is to be understood that we limit ourselves only as defined in the appended claims.

What is claimed is:

1. A method for producing silico-dihydrogen sulfate [SiO(HSO$_4$)$_2$] from sodium metasilicate pentahydrate, which comprises:
   a. mixing slowly sodium metasilicate pentahydrate into concentrated sulfuric acid in the ratio of 1:4 mols with agitation over a period of 15–20 minutes, keeping the reaction temperature between 25°–100° C; the chemical reaction is completed in 2–6 hours,
   b. producing a white granular mixture containing dihydroxy silicon dihydrogen sulfate [(HO)$_2$Si(HSO$_4$)$_2$], silico-dihydrogen sulfate [SiO(HSO$_4$)$_2$]; sodium hydrogen sulfate and water, c. filtering off said sodium hydrogen sulfate and water,
d. adding an additional 2 mols of concentrated sulfuric acid per mol of sodium metasilicate to said white granular mixture for 20–30 minutes,
e. filtering off diluted sulfuric acid and sodium hydrogen sulfate, and thereby
f. producing additional silico-dihydrogen sulfate [SiO(HSO$_4$)$_2$] from said dihydroxy silicon dihydrogen sulfate.

2. The silico-dihydrogen sulfate [SiO(HSO$_4$)$_2$] produced in accordance with the process of claim 1.

3. A method for producing silico-dihydrogen sulfate [SiO(HSO$_4$)$_2$] from sodium metasilicate which comprises:
  a. providing a sodium metasilicate containing less than 6 mols of water per mol of sodium metasilicate,
  b. mixing slowly said sodium metasilicate into concentrated sulfuric acid in the ratio of 1:4 mols with agitation over a period of 15–20 minutes, keeping the reaction temperature between 25°–100° C; the chemical reaction is completed in 2–6 hours
  c. producing a white granular mixture containing dihydroxy silicon dihydrogen sulfate [(HO)$_2$Si(HSO$_4$)$_2$], silico-dihydrogen sulfate [SiO(HSO$_4$)$_2$], sodium hydrogen sulfate and water,
  d) filtering off sodium hydrogen sulfate and water,
  e. adding an additional 2 mols of concentrated sulfuric acid per mol of sodium metasilicate to said white granular mixture for 20-30 minutes,
  f) filtering off sulfuric acid and sodium hydrogen sulfate, and thereby
  g) producing additional silico-dihydrogen sulfate [SiO(HSO$_4$)$_2$] from said dihydroxy silicon dihydrogen sulfate.

4. The silico-dihydrogen sulfate [SiO(HSO$_4$)$_2$] produced in accordance with the process of claim 3.

5. A method for producing silico-dihydrogen sulfate [SiO(HSO$_4$)$_2$] from sodium metasilicate which comprises:
  a. providing a potassium metasilicate containing less than 6 mols of water per mol of potassium metasilicate,
  b. mixing slowly said potassium metasilicate into concentrated sulfuric acid in the ratio of 1:4 mols with agitation over a period of 15–20 minutes, keeping the reaction temperature between 25°–100° C; the chemical reaction is completed in 2–6 hours
  c. producing a white granular mixture containing dihydroxy silicon dihydrogen sulfate [(HO)$_2$Si(HSO$_4$)$_2$], silico-dihydrogen sulfate [SiO(HSO$_4$)$_2$], potassium hydrogen sulfate and water,
  d. filtering off potassium hydrogen sulfate and water,
  e. adding 2 mols of concentrated sulfuric acid per mol of potassium metasilicate to said white granular mixture for 20–30 minutes,
  f. filtering off diluted sulfuric acid and potassium hydrogen sulfate and thereby
  g. producing additional silico-dihydrogen sulfate [SiO(HSO$_4$)$_2$] from said dihydroxy silicon dihydrogen sulfate.

6. The silico-dihydrogen sulfate [SiO(HSO$_4$)$_2$] produced in accordance with the process of claim 5.

* * * * *